US011540046B2

(12) United States Patent
Song

(10) Patent No.: US 11,540,046 B2
(45) Date of Patent: Dec. 27, 2022

(54) AUDIO OUTPUT MODE ADJUSTMENT STRUCTURE, METHOD, APPARATUS, AND ELECTRONIC DEVICE

(71) Applicant: Beijing Xiaomi Mobile Software Co., Ltd., Beijing (CN)

(72) Inventor: Ziping Song, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 46 days.

(21) Appl. No.: 17/167,144

(22) Filed: Feb. 4, 2021

(65) Prior Publication Data
US 2021/0400379 A1 Dec. 23, 2021

(30) Foreign Application Priority Data

Jun. 19, 2020 (CN) .......................... 202010566348.2

(51) Int. Cl.
*H04R 1/34* (2006.01)
*H04M 1/02* (2006.01)
(Continued)

(52) U.S. Cl.
CPC ............ *H04R 1/345* (2013.01); *H04M 1/026* (2013.01); *H04R 1/025* (2013.01); *H04R 3/00* (2013.01); *H04R 2499/11* (2013.01)

(58) Field of Classification Search
CPC .................................. H04R 1/345; H04R 1/34
See application file for complete search history.

(56) References Cited

U.S. PATENT DOCUMENTS

2007/0298827 A1   12/2007  Hansson
2014/0140558 A1*  5/2014   Kwong ................. H04R 3/007
                                              381/345
(Continued)

FOREIGN PATENT DOCUMENTS

JP        9-55971 A      2/1997
JP     2001-285428 A    10/2001
WO   WO 2007/148151 A1  12/2007

OTHER PUBLICATIONS

The partial Supplementary European Search Report dated Aug. 2, 2021 in European Patent Application 21155902.6, citing documents AA and AO-AQ therein, 20 pages.

(Continued)

*Primary Examiner* — Olisa Anwah
(74) *Attorney, Agent, or Firm* — Oblon, McClelland, Maier & Neustadt, L.L.P.

(57) ABSTRACT

Aspects of the present disclosure provide an audio output mode adjustment structure that can include a sound output channel communicating an interior and an exterior of the electronic device and an adjusting unit. An opening of the sound output channel is located at the top of the electronic device. The adjustment unit moves relative to the opening of the sound output channel so that when the electronic device outputs audio in a loud-speaking mode, the adjustment unit does not cover the sound output channel, and sound waves propagate in a straight line through the opening of the sound output channel, and when the electronic device outputs audio in the handset mode, the adjustment unit covers the opening of the sound output channel, so that the sound waves propagate toward a display screen side of the electronic device through the opening of the sound output channel.

14 Claims, 4 Drawing Sheets

(51) Int. Cl.
*H04R 1/02* (2006.01)
*H04R 3/00* (2006.01)

(56) References Cited

U.S. PATENT DOCUMENTS

2015/0340795 A1   11/2015  Lee et al.
2016/0249123 A1*  8/2016  Lee ........................ H04M 1/18

OTHER PUBLICATIONS

Extended European Search Report dated Dec. 20, 2021 in corresponding European Patent Application No. 21155902.6 citing document AA therein, 20 pages.

* cited by examiner

AUDIO OUTPUT MODE ADJUSTMENT STRUCTURE, METHOD, APPARATUS, AND ELECTRONIC DEVICE

CROSS-REFERENCE TO RELATED APPLICATIONS

This application is based upon and claims priority to Chinese Patent Application No. CN 202010566348.2, filed on Jun. 19, 2020, the entire contents of which are incorporated herein by reference.

TECHNICAL FIELD

The present disclosure relates to the field of electronic equipment, including to an audio output mode adjustment structure, method, apparatus and electronic device.

BACKGROUND

With the advancement of society, mobile phones and other electronic devices continue to introduce new devices. Many manufacturers pay more and more attention to the audio play effect of electronic devices. By adding speakers, audio sound played by electronic devices in a speaker mode is more stereo, which can meet the needs for sound quality of users. However, due to the limited space of the overall frame of the electronic device, the available space for each component in the electronic device is getting smaller and smaller, and the audio effects in both of a handset mode and a speaker mode cannot be taken into account at the same time.

SUMMARY

According to a first aspect of the present disclosure, there is provided an audio output mode adjustment structure, which can be applied to an electronic device with a handset mode. The audio output mode adjustment structure includes a sound output channel communicating an interior of the electronic device and an exterior of the electronic device, and an opening of the sound output channel is located at the top of the electronic device. Further, the audio output mode adjustment structure can also include an adjustment unit, the adjustment unit is configured to move relative to the opening of the sound output channel. When the electronic device outputs audio in a loud-speaking mode, the adjustment unit does not cover the sound output channel, and sound waves propagate in a straight line through the opening of the sound output channel. When the electronic device outputs audio in the handset mode, the adjustment unit covers the opening of the sound output channel, so that the sound waves propagate toward a display screen side of the electronic device through the opening of the sound output channel.

According to a second aspect of the present disclosure, there is provided an audio output mode adjustment method, which is applied to an electronic device having the audio output mode adjustment structure mentioned above. The audio output mode adjustment method includes receiving audio output mode adjustment information, and determining a target audio output mode according to the audio output mode adjustment information. Further, according to the target audio output mode, the method can include adjusting a position of an adjustment unit of the audio output mode adjustment structure relative to an opening of a sound output channel.

According to a third aspect of the present disclosure, there is provided an audio output mode adjustment apparatus, which is applied to the electronic device having the audio output mode adjustment structure mentioned above. The audio output mode adjustment apparatus includes a receiving module that is configured to receive audio output mode adjustment information, a determining module that is configured to determine a target audio output mode according to the audio output mode adjustment information, and an adjusting module that is configured to, according to the target audio output mode, a position of an adjustment unit of the audio output mode adjustment structure relative to an opening of a sound output channel.

According to a fourth aspect of the present disclosure, there is provided an electronic device, wherein the electronic device includes the audio output mode adjustment structure mentioned above.

It should be understood that the above general description and the following detailed description are only exemplary and explanatory, and do not limit the present disclosure.

BRIEF DESCRIPTION OF THE DRAWINGS

The drawings herein are incorporated into the specification and constitute a part of the specification, show exemplary embodiments in accordance with the present disclosure, and together with the specification are used to explain the principle of the present disclosure.

DETAILED DESCRIPTION

Figure 1:
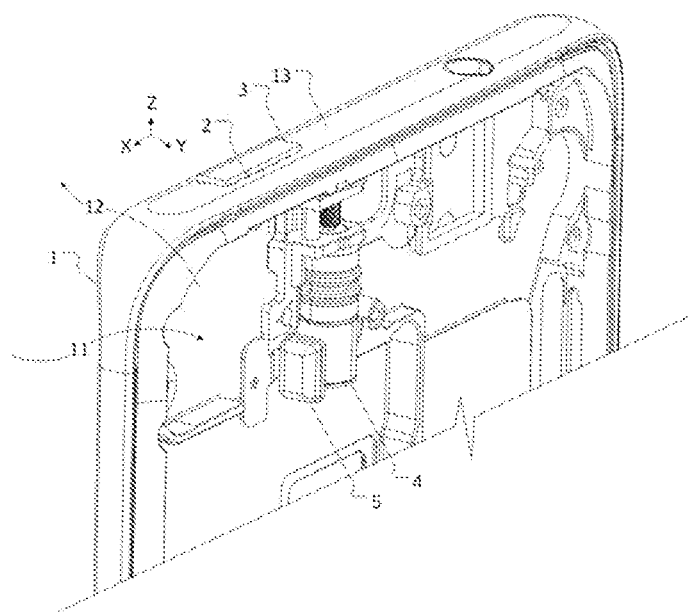
FIG. 1 is a schematic diagram showing an audio output mode adjustment structure according to an exemplary embodiment.

The exemplary embodiments will be described in detail here, and examples thereof are shown in the accompanying drawings. When the following description refers to the accompanying drawings, unless otherwise indicated, the same numbers in different drawings represent the same or similar elements. The implementation manners described in the following exemplary embodiments do not represent all implementation manners consistent with the present invention. Rather, they are merely examples of apparatus and methods consistent with some aspects of the present disclosure as detailed in the appended claims.

In related technologies, electronic devices, such as mobile phones usually include two audio output modes, one is a handset output mode used in a handheld call state, that is, you need to hold the phone while talking on the phone, and the other is a loudspeaker output mode in an audio external play state, i.e. in a hands-free state, which means that you don't have to hold the phone while talking on the phone. Usually, a hole is opened at the top of a front surface of an electronic device such as a mobile phone, where the front surface refers to a side where the display screen of the electronic device is located, so as to be used as a handset. In the context of the present disclosure, the front surface of the display screen is called as a display screen side.

In one example, a speaker is provided at the top of the electronic device, and when the electronic device outputs audio information in a loud-speaking output mode, the speaker is used as a sound-emitting device. When a user holds the electronic device for a call, he uses a handset of the electronic device to receive audio information, and the audio information is provided by the speaker. In a handset output mode, the audio information needs to be in a low-frequency bandwidth state. However, since the speaker component is used as the sound-emitting device in this example, the audio information cannot be kept in the low-frequency bandwidth state in the handset output mode. Therefore, in order to make the audio information output by the electronic device in the handset output mode is in the low-frequency bandwidth state, a rear cavity of the speaker is opened to ensure that the user can talk normally when holding the electronic device. However, opening the rear cavity of the speaker affects audio stereo effect of the electronic device in the loud-speaking output mode, resulting in a weak stereo field and affecting the user experience.

In another example, an earpiece is provided at the top of the electronic device as a sound-emitting device, and a hole is opened at the top of a front surface of the electronic device, in order to be used as a handset. When the user is holding the electronic device for a call, by using the handset, the user receives audio information sent by the earpiece. At the same time, in order to put voice of the call outside (i.e., making a hands free conversation), a speaker is provided at the bottom of the electronic device, and a through hole is opened at the bottom of the electronic device. When the audio output mode of the electronic device is a loud-speaking output mode, the speaker at the bottom outputs audio information outward. Since only the speaker is provided at the bottom of the electronic device, a symmetrical stereo field cannot be formed in a state that audio information is putting outside of the electronic device, which reduces the sound quality of the audio information, affects the user experience, and cannot meet the user's demand for high-quality sound effects.

The present disclosure proposes an audio output mode adjustment structure, which is applied to an electronic device with a handset mode, wherein the electronic device may be, for example, an electronic device with a call function, such as a mobile phone or a tablet computer. The audio output mode adjustment structure includes a sound output channel communicating inside and outside of the electronic device. An opening of the sound output channel is located at a side edge of a top of the electronic device. The audio output mode adjustment structure further includes an adjustment unit which moves relative to the sound output channel. When the electronic device outputs audio in a loud-speaking mode, the adjustment unit does not cover the sound output channel, and sound waves propagate along a straight line through the opening of the sound output channel A speaker at the top of the electronic device can form a symmetrical stereo field with a speaker disposed at the bottom of the electronic device, which improves the stereo effect of the audio in the loud-speaking mode and meets the user's demand for high-quality sound. When the electronic device outputs audio in the handset mode, the adjustment unit covers the opening of the sound output channel so that sound waves propagate through the opening of the sound output channel toward a display screen side of the electronic device, and adjust the audio output mode of the electronic device to the handset mode.

In an exemplary embodiment, as shown in FIG. 1, an audio output mode adjustment structure includes a sound output channel 2 communicating an interior 11 of the electronic device 1 and an exterior 12 of the electronic device 1. The sound output channel 2 runs through a top 13 of the electronic device 1 and an opening 21 of the sound output channel 2 (see FIG. 3) is located at a side edge of the top 13 of the electronic device 1. The shape of the opening 21 of the sound output channel 2 may be, for example, a circle, an ellipse, or a rectangle, and a radial cross-sectional shape of the sound output channel 2 may be the same as that of the opening 21 thereof. Of course, it can be understood that the radial cross-sectional shape of the sound output channel 2 may also be different from the shape of the opening 21 thereof. Along an extension direction of the sound output channel 2, the sound output channel 2 can be an equal-diameter channel or a variable-diameter channel. For example, along the propagation direction of sound, area of a radial cross section of one end of the sound output channel 2 connected to the interior 11 of the electronic device 1 is A, and area of a radial cross section of the other end of the sound output channel 2 connected to the exterior of the electronic device 1 is B, the area A can be smaller than the area B, so as to further enhance loud-speaking effect of the speaker. In this embodiment, in order to further improve the sound output effect of the electronic device 1, the sound output channel 2 is not limited to one, and multiple sound output channels can be set according to actual conditions.

Figure 3:
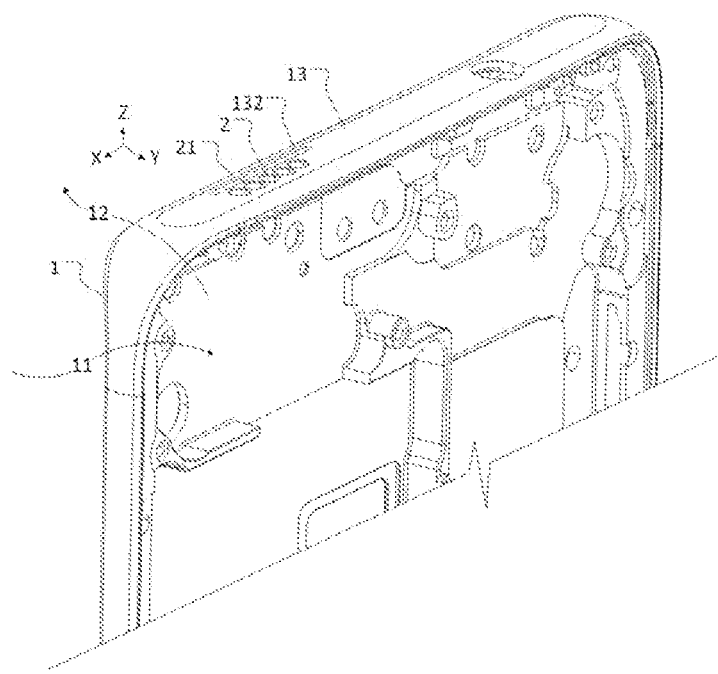
FIG. 3 is a schematic diagram showing an electronic device according to an exemplary embodiment.

In this embodiment, referring to FIG. 3, when the electronic device 1 outputs audio in a loud-speaking mode, sound waves propagate in a straight line through the opening 21 of the sound output channel 2. For example, they propagate in the first direction (referring to the Z-axis direction shown in FIG. 3) and cooperate with the speaker (not shown in the figures) disposed at the bottom of the electronic device 1. When the electronic device 1 outputs audio in the loud-speaking mode, the speakers at upper and lower ends of the electronic device 1 output audio information together to form a symmetrical stereo field, which can enhance the stereo effect of the audio, improve sound quality, and enhance the user experience.

Figure 4:
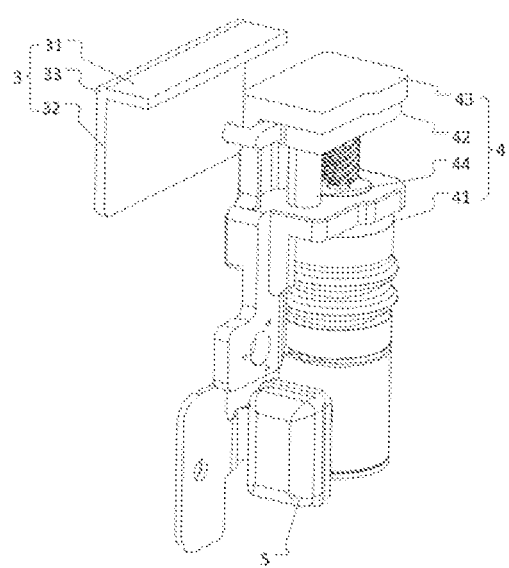
FIG. 4 is a schematic diagram showing a drive assembly and an adjusting unit according to an exemplary embodiment.

In this embodiment, as shown in FIGS. 1, 3, and 4, the audio output mode adjustment structure further includes an adjustment unit 3, which is used to adjust an audio output mode. When the electronic device 1 switches to the headset mode, the adjustment unit 3 is configured to change a propagation direction of the sound waves at the opening 21 of the sound output channel 2, so that the sound waves propagate from the opening 21 of the sound output channel 2 toward the display screen side of the electronic device 1. For example, the sound wave propagates in the second direction (referring to the Y-axis direction shown in FIG. 1), so as to output audio information in the handset mode when the user holds the electronic device 1 while talking. The adjustment unit 3 changes the propagation direction of the sound waves of the electronic device 1 (i.e., changes the propagation direction of the sound waves from the Z-axis direction to the Y-axis direction) and then adjusts the audio output mode of the electronic device 1, so as to output audio information in the loud-speaking mode or the handset mode according to user requirements.

In this embodiment, the sound output channel 2 and the adjustment unit 3 are provided. By changing the propagation direction of the sound waves at the opening 21 of the sound output channel 2, both the handset output mode and the loud-speaking output mode can be realized without separate settings of the speaker and the earpiece, avoid occupying too much internal space of the electronic device 1. At the same time, a speaker is also provided at the bottom of the electronic device 1. In the loud-speaking output mode, the speaker at the bottom cooperates with the sound output channel 2 to form the stereo sound output effect and improve the user experience.

In another exemplary embodiment, as shown in FIG. 4, the adjusting unit 3 includes an adjusting part 31 and a connecting part 32 connected to each other. Under the action of an external force, the connecting part 32 drives the adjusting part 31 to move relative to the opening 21 of the sound output channel 2, so as to cover or not cover the opening 21. When the electronic device 1 outputs audio in the loud-speaking mode, the adjusting part 31 does not cover the opening 21 of the sound output channel 2 and the sound at the opening 21 propagates to the outside of the electronic device 1 in a straight line. When the audio output mode of the electronic device 1 is the handset output mode, the adjusting part 31 covers the opening 21 of the sound output channel 2 and changes the propagation direction of the sound waves at the opening 21 to be used as a handset.

Figure 2:
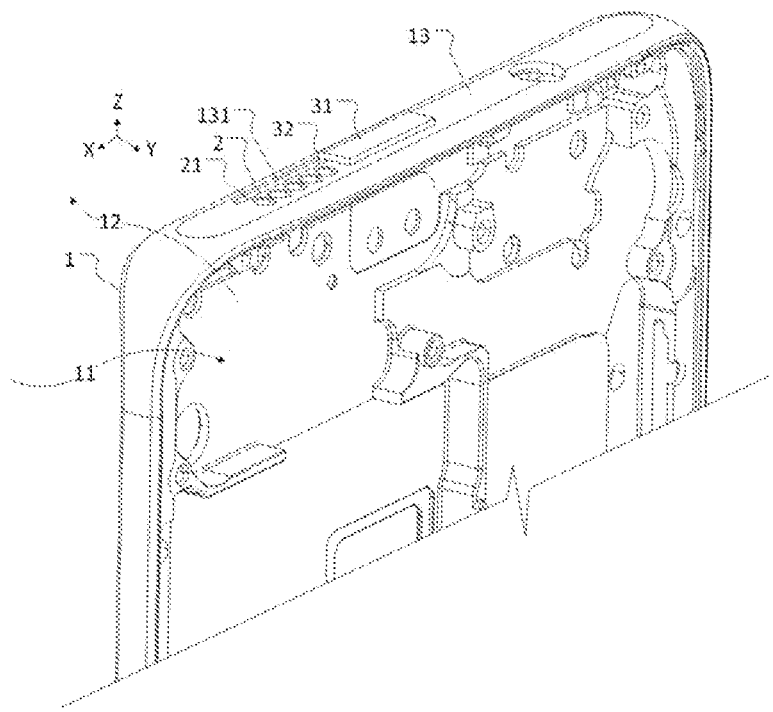
FIG. 2 is a schematic diagram showing an audio output mode adjustment structure according to another exemplary embodiment.

In an example, referring to FIG. 2, the connecting part 32 is provided in the interior 11 of the electronic device 1, the connecting part 32 extends from the interior 11 of the electronic device 1 to the exterior 12 of the electronic device 1, and the adjusting part 31 is provided at the outside of the side-edge of the top 13 the electronic device 1. The adjusting part 31 and the connecting part 32 of the adjusting unit 3 are fixedly connected at a predetermined angle, for example, the predetermined angle is 90°. Under the action of external force, the connecting part 32 slides along a width direction of the electronic device 1 (referring to the X-axis direction shown in FIG. 2), thereby driving the adjusting part 31 to slide along the side-edge of the top 13 of the electronic device 1 relative to the sound output channel 2, so as to cover or not cover the sound output channel 2. A sliding groove 131 is provided at the top 13 of the electronic device 1. The sliding groove 131 is extended in its width direction. One end of the connecting part 32 extends into the sliding groove 131 and can slide along the extending direction of the sliding groove 131, and the other end of the connecting part 32 (that is, the end connected to the adjusting part 31) passes through the sliding groove 131 and protrudes to the exterior 12 of the electronic device 1.

The external force acts on the connecting part 32, and then the connecting part 32 drives the adjusting part 31 to move between a first end and a second end of the sliding groove 131 to adjust the relative position of the adjusting part 31 and the sound output channel 2, so as to cover or not cover the sound output channel 2, thereby changing the propagation direction of the sound waves at the opening 21 of the sound output channel 2. When the adjusting part 31 is located at the first end of the sliding groove 131 (referring to the position shown in FIG. 2), the adjusting part 31 does not cover the opening 21 of the sound output channel 2, and the audio output mode of the electronic device 1 is in the loud-speaking mode, which is convenient for users to hear audio information in the external playing mode (i.e., making a hands free conversation). When the adjusting part 31 is located at the second end of the sliding groove 131 (not shown in FIG. 2), the adjusting part 31 covers the opening 21 of the sound output channel 2, and the audio output mode of the electronic device 1 is the headset mode, which is convenient for the user to hear audio information while holding the electronic device 1.

In another exemplary embodiment, as shown in FIG. 1, FIG. 3, and FIG. 4, the adjusting part 31 is rotationally connected with the connecting part 32. When the electronic device 1 outputs audio in the loud-speaking mode, the adjusting part 31 and the connecting part 32 are located in the interior 11 of the electronic device 1, the adjusting part 31 does not cover the opening 21 of the sound output channel 2. When the audio output mode of the electronic device 1 is the headset mode, the connecting part 32 drives the adjusting part 31 to protrude to the exterior 12 of the electronic device 1. For example, a moving channel 132 is disposed at the top 13 of the electronic device 1, and the moving channel 132 communicates the interior 11 and the exterior 12 of the electronic device 1. The moving channel 132 extends along the width direction of the electronic device 1 (referring to the X-axis direction shown in FIG. 3) and is parallel to the sound output channel 2. The connecting part 32 drives the adjusting part 31 to protrude to the exterior 12 of the electronic device 1 through the moving channel 132. The adjusting part 31 is flipped relative to the connecting part 32 to cover the opening 21 of the sound output channel 2 and switch the audio output mode of the electronic device 1 to the handset mode, which is convenient for the user to make a call while holding the electronic device 1.

In another exemplary embodiment, as shown in FIGS. 3 and 4, the adjustment unit 3 further includes a rotation conditioning part 33, and the rotation conditioning part 33 may be, for example, a torsion spring or an elastic piece. For example, the adjusting part 31 and the connecting part 32 may be rectangular plates, and the adjusting part 31 is rotationally connected with the connecting part 32 by the rotation conditioning part 33. The rotation conditioning part 33 is used to apply a flip force on the adjusting part 31 to drive the adjusting part 31 to flip a preset angle relative to the connecting part 32. When the connecting part 32 drives the adjusting part 31 to protrude to the exterior 12 of the electronic device 1 through the moving channel 132 that runs through the top 13 of the electronic device 1, the external force originally acting on the rotation conditioning part 33 disappears, and under the action of restoring force of the rotation conditioning part 33 itself (that is, the action of the torsion spring or the elastic piece to return to a free state), the adjusting part 31 is driven to flip relative to the connecting part 32, thereby making the adjusting part 31 and the connecting part 32 form a preset angle, and the adjusting part 31 covers the opening 21 of the sound output channel 2. Among them, the preset angle may be 90°, 85°, etc., for example. Since the adjusting part 31 covers the opening 21 of the sound output channel 2, the sound waves at the opening 21 of the sound output channel 2 is covered by the adjusting part 31, thereby making the sound wave to change the propagation direction (i.e., changes the propagation direction of the sound waves from the Z-axis direction to the Y-axis direction), and emit sound toward the front surface of the display screen along the display screen side of the electronic device 1. At this time, the sound output channel 2 and the adjusting part 31 form a handset all together, this is convenient for the user to receive audio information in a state of holding the electronic device 1.

When the connecting part 32 drives the adjusting part 31 to move toward the interior 11 of the electronic device 1, a side wall of the moving channel 132 acts on the rotation conditioning part 33, and there is an interaction force between the side wall of the moving channel 132 and the rotation conditioning part 33. Under the action of the interaction force above, the adjusting part 31 is driven to flip relative to the connecting part 32, and the adjusting part 31 and the connecting part 32 form a preset angle. Furthermore, the preset angle at this time is 180°. The adjusting part 31 moves along the moving channel 132 until the adjusting part 31 is hidden in the interior 11 of the electronic device 1. At this point, the adjusting part 31 does not cover the opening 21 of the sound output channel 2. Since the adjusting part 31 does not cover the opening 21 of the sound output channel 2, the sound waves at the opening 21 of the sound output channel 2 are no longer covered by the adjusting part 31 and then propagate from the opening 21 of the sound output channel 2 along a straight line. At this time, when the electronic device outputs audio in the loud-speaking output mode, the sound output channel 2 and a speaker provided at the bottom of the electronic device 1 produce sound together to form a stereo sound output effect.

In another exemplary embodiment, as shown in FIG. 1, the audio output mode adjustment structure further includes a drive assembly 4 and a drive controller 5. The drive assembly 4 may be, for example, an electric cylinder (not shown in the figures), and the drive controller 5 is used to control the electric cylinder to work, and the drive controller 5 is electrically connected with a control unit (not shown in the figures) of the electronic device 1. A piston end of the electric cylinder is connected with the connecting part 32, and the piston end moves linearly (i.e., take a straight-line motion) in a cylinder body of the electric cylinder to drive the connecting part 32 to move, and then adjust a position of the adjusting part 31 connected with the connecting part 32, so as to cover or not to cover the sound output channel 2.

In an example, referring to FIG. 2, the adjusting part 31 of the adjusting unit 3 is fixedly connected with the connecting part 32, the connecting part 32 is arranged in the interior 11 of the electronic device 1, and the adjusting part 31 is arranged at the outside of the side-edge of the top 13 of the electronic device 1. The adjusting part 31 can slide along the sliding groove 131 opened at the top 13 of the electronic device 1, and the sliding groove 131 runs through the top 13 of the electronic device 1. One end of the connecting part 32 passes through the sliding groove 131 and connects with the adjusting part 31, and the other end of the connecting part 32 is fixedly connected to the piston end of the electric cylinder (not shown in the figures). The piston end of the electric cylinder drives the connecting part 32 to move between the first end and the second end of the sliding groove 131, so as to adjust the relative position of the adjusting part 31 and the sound output channel 2.

In another example, referring to FIG. 3, the adjusting part 31 of the adjusting unit 3 is in rotation connection with one end of the connecting part 32, and the other end of the connecting part 32 is fixedly connected to the piston end of the electric cylinder. When the electronic device 1 outputs audio in the loud-speaking mode, the adjusting part 31 and the connecting part 32 both are located in the interior 11 the electronic device 1. When it is necessary to switch the audio output mode of the electronic device 1 to the handset mode, under the action of the electric cylinder (not shown in the figures), the adjusting part 31 is driven by the connecting part 32 to pass through the moving channel 132 and protrude to the exterior 12 of the electronic device 1. The adjusting part 31 is turned over relative to the connecting part 32 to cover the opening 21 of the sound output channel 2. At this time, the sound waves at the opening 21 of the sound output channel 21 is covered by the adjusting part 31, and the propagation direction of the sound waves is changed as emitting sound toward the front surface of the display screen along the display screen side of the electronic device 1.

In another exemplary embodiment, as shown in FIG. 4, the drive assembly 4 includes a torque output unit 41 and a motion transmitting unit 42 connected to the torque output unit 41. The motion transmitting unit 42 is fixedly connected with the connecting part 32. The torque output unit 41 outputs torque to drive the motion transmitting unit 42 to take a straight-line motion along the first direction of the electronic device (referring to the Z-axis direction shown in FIG. 3).

Figure 7:
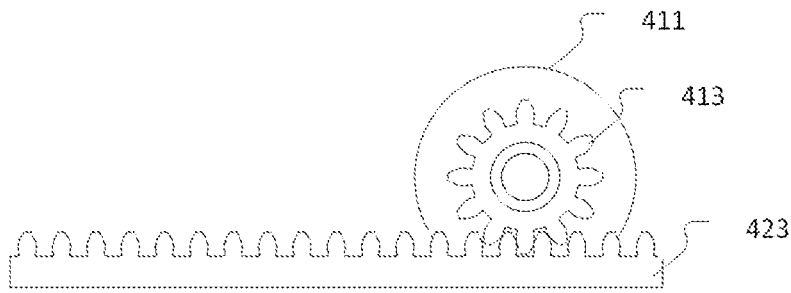
FIG. 7 is a schematic diagram showing a drive assembly according to another exemplary embodiment.

In an example, referring to FIG. 7, the torque output unit 41 may include, for example, a motor 411 and a gear 413 fixedly connected to an output shaft of the motor 411. The motor 411 is driven by the drive controller 5 provided in the interior 11 of the electronic device 1. The motion transmitting unit 42 includes a rack 423. The gear 413 meshes with the rack 423, and the rack 423 is fixedly connected with the connecting part 32. Under the action of the driving force output by the motor 411, the gear 413 drives the rack 423 to move, thereby driving the connecting part 32 to move along the first direction (referring to the Z-axis direction shown in FIG. 3), thereby driving the adjusting part 31 connected with the connecting part 32 to move toward the exterior 12 of the electronic device 1.

Figure 6:
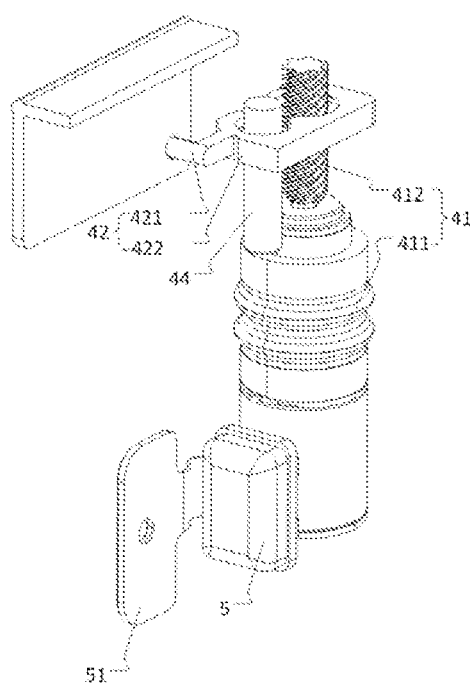
FIG. 6 is a schematic diagram showing a drive assembly according to an exemplary embodiment.

In another example, referring to FIG. 6, the torque output unit 41 may include, for example, a motor 411 and a screw bar 412 connected to the output shaft of the motor 411. The motor 411 is electrically connected to the drive controller 5 disposed in the interior 11 of the electronic device 1. The motion transmitting unit 42 is in threaded connection with the screw bar 412. Through the turning of the screw bar 412, the motion transmitting unit 42 is driven to make linear motion along the first direction of the electronic device 1 (referring to the Z-axis direction shown in FIG. 3).

Referring to FIG. 6 again, the motion transmitting unit 42 includes a first connecting part 421 and a transmission part 422. One end of the first connecting part 421 is fixedly connected with the connecting part 32, the other end of the first connecting part 421 is fixedly connected with the motion transmitting part 422, and the motion transmitting part 422 is in threaded connection with the screw bar 412. Under the action of the driving force output by the motor 411, the screw bar 412 drives the transmission part 422 to move. The first connecting part 421 and the transmission part 422 move synchronously. Through the first connecting part 421, the connecting part 32 drives the adjusting part 31 to move toward the interior 11 or exterior 12 of the electronic device 1. When the adjusting part 31 is located in the interior 11 of the electronic device 1, the audio output mode of the electronic device 1 is the loud-speaking mode. When the adjusting part 31 is located in the exterior 12 of the electronic device 1, the adjusting part 31 covers the opening 21 of the sound output channel 2 and changes the propagation direction of the sound waves at the opening 21 of the sound output channel 2 and the audio output mode of the electronic device 1 is the handset mode.

Figure 5:
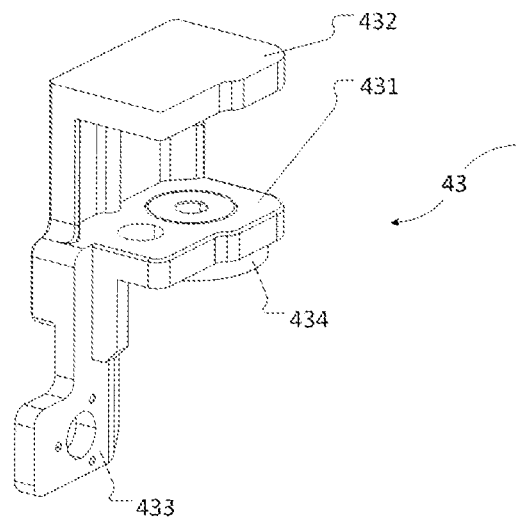
FIG. 5 is a schematic diagram showing a mounting rack according to an exemplary embodiment.

In another exemplary embodiment, as shown in FIGS. 5 and 6, the drive assembly 4 further includes a mounting rack 43, and the mounting frame 43 includes a first mounting part 431, a second mounting part 432 and a supporting part 434 that are parallel to each other. The motor 411 is disposed at a side of the first mounting part 43 away from the second mounting part 432, and a shell of the motor 411 is fixedly connected with the first mounting part 43 through the supporting part 434. The motor 411 is electrically connected with the drive controller 5 disposed in the interior 11 of the electronic device 1, and the drive controller 5 is fixedly connected to the third mounting part 51 disposed on the shell structure of the electronic device 1.

In this embodiment, still referring to FIGS. 5 and 6, the screw bar 412 connected with the motor 411 is disposed between the first mounting part 431 and the second mounting part 432, and the output shaft of the motor 411 is in rotation connection with the first mounting part 431. The output shaft of the motor 411 passes through the first mounting part 431 and is fixedly connected with one end of the screw bar 412, the other end of the screw bar 412 is rotationally connected with the second mounting part 431, and the second mounting part 432 is fixedly connected with an inner wall of the shell structure at the top 13 of the electronic device 1.

In this embodiment, as shown in FIG. 5, the mounting rack 43 further includes a fixing part 433. The fixing part 433 is fixedly connected with the first mounting part 431, and the fixing part 433 is connected with the shell structure of the electronic device 1. Wherein, the fixing part 433 can be pasted or welded to the shell structure of the electronic device 1; alternately, the fixing part 433 can also be fixed to the shell structure of the electronic device 1 by screws.

In this embodiment, as shown in FIG. 5 and FIG. 6, the drive assembly 4 further includes a limiting part 44. The limiting part 44 is parallel to the screw bar 412, and both ends of the limiting part 44 are fixedly connected with the first mounting part 431 and the second mounting part 431, respectively. The limiting part 44 passes through the motion transmitting unit 42 in the above embodiment, that is, the motion transmitting part 422, and the motion transmitting part 422 is in sliding connection with the limiting part 44. The limiting part 44 is used for limiting the motion transmitting part 422 to take a reciprocate motion between the first mounting part 431 and the second mounting part 432.

Figure 8:
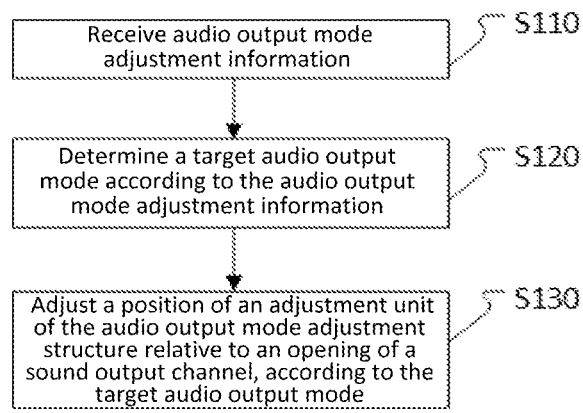
FIG. 8 is a flowchart of a method according to an exemplary embodiment.

The present disclosure also provides an audio output mode adjustment method, which is applied to an electronic device having the audio output mode adjustment structure as described above. Referring to FIG. 8, the method includes the following steps.

At step S110, audio output mode adjustment information is received;

At step S120, a target audio output mode is determined according to the audio output mode adjustment information. In this step, the target audio output mode is, for example, a loud-speaking mode or a handset mode.

At step S130, a position of an adjustment unit of the audio output mode adjustment structure relative to an opening of a sound output channel is adjusted according to the target audio output mode. In this step, when the target audio output mode is the loud-speaking mode, the adjustment unit does not cover the opening of the sound output channel, and the sound waves propagate along a straight line through the opening of the sound output channel: when the target audio output mode is the handset mode, the adjustment unit is adjusted to cover the opening of the sound output channel, so that sound waves propagate through the opening of the sound output channel toward the display screen side of the electronic device.

The present disclosure also provides an audio output mode adjustment apparatus, which is applied to an electronic device having the audio output mode adjustment structure mentioned above.

Figure 9:
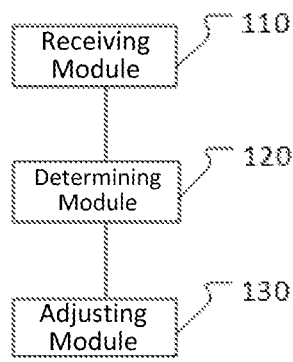
FIG. 9 is a block diagram showing an apparatus according to an exemplary embodiment.

Referring to FIG. 9, the audio output mode adjusting apparatus includes a receiving module 110, a determining module 120 and an adjusting module 130. The receiving module 110 is configured to receive audio output mode adjustment information, the determining module 120 is configured to determine a target audio output mode according to the audio output mode adjustment information, and the adjusting module 130 is configured to adjust a position of an adjustment unit of the audio output mode adjustment structure relative to an opening of a sound output channel, according to the target audio output mode. Of course, it should be understood that one or more of the modules described in this specification can be implemented by circuitry.

The present disclosure also provides an electronic device, which may be a mobile communication electronic product such as a mobile phone and a tablet computer. The electronic device includes a control unit, a speaker located at the bottom of the electronic device, and the aforementioned audio output mode adjustment structure.

The audio output mode adjustment structure can adjust the output mode of the electronic device to meet the needs of the versatility of the electronic device, reduce the occupation of the internal space of the electronic device, leave more available space for other components, and is conductive to the division of the interior space of the electronic device, which makes the layout more reasonable.

At the same time, the audio output mode of the electronic device can be switched through the audio output mode adjustment structure, and the audio information can be output in the loud-speaking mode or the handset mode according to the user's use needs, so as to improve the user's use experience. When the user needs to listen to audio in the headset mode, the control unit controls the audio output mode adjustment structure according to the user's selection, so that the adjustment part in the audio output mode adjustment structure protrudes to outside of the electronic device, and the adjustment part covers the opening of the sound output channel located at the top of the electronic device. At this point, the sound waves are covered by the adjustment part, and the propagation direction of the sound waves is changed, so as to emit sound toward the front surface of the display screen along the display screen side of the electronic device 1, so that the sound sent from the handset is clearer when the user listens to the audio.

The technical solutions provided by the embodiments of the present disclosure may include beneficial effects. For example, the propagation direction of the sound waves at the opening of the sound output channel can be changed by the adjustment unit, and the audio output mode of the electronic device can be adjusted to the handset mode or the loud-speaking mode. While keeping normal call function of the electronic device, the stereo effect of the audio in the loud-speaking mode is improved to meet the user's demand for the sound quality of the loud-speaking.

When the user needs to output audio in the loud-speaking mode, the control unit controls the audio output mode adjustment structure according to the user's selection, so that the adjusting part in the audio output mode adjustment structure moves toward inside of the electronic device, and the adjustment part does not cover the opening of the sound output channel located at the top of the electronic device. At this point, the sound wave is not covered by the adjusting part and travels along the sound output channel of the electronic device in a straight line. The speaker at the top of the electronic device and the speaker at the bottom of the electronic device make a sound together to form a symmetrical stereo field, which improves the stereo effect of the audio in the loud-speaking mode.

Those skilled in the art will easily think of other embodiments of the present disclosure after considering the description and practicing the application herein. The present disclosure is intended to cover any variations, uses, or adaptive changes of the present disclosure, which follow the general principles of the present disclosure and include common general knowledge or customary technical means in the technical field to which this disclosure is not applied. The description and examples are to be considered exemplary only, and the true scope and spirit of this disclosure are pointed out by the following claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. An audio output mode adjustment structure that is applied to an electronic device with a handset mode, the audio output mode adjustment structure comprising:
    a sound output channel communicating an interior of the electronic device and an exterior of the electronic device and having an opening that is located at a top of the electronic device; and
    an adjustment unit that is configured to move relative to the opening of the sound output channel, wherein when the electronic device outputs audio in:
        a loud-speaking mode, the adjustment unit does not cover the sound output channel and sound waves propagate in a straight line through the opening of the sound output channel, and
        the handset mode, the adjustment unit covers the opening of the sound output channel so that the sound waves propagate toward a display screen side of the electronic device through the opening of the sound output channel;
    the adjusting unit further comprises an adjusting part and a connecting part connected with each other, and under an action of an external force, the connecting part drives the adjusting part to move relative to the opening of the sound output channel;
    wherein, when the electronic device outputs audio in:
        the loud-speaking mode, the adjusting part does not cover the opening of the sound output channel;
        the handset mode, the adjusting part covers the opening of the sound output channel:
    wherein: the adjusting part is rotationally connected with the connecting part, and the adjusting part and the connecting part is located at the interior of the electronic device and does not cover the opening of the sound output channel when the electronic device outputs audio in the loud-speaking mode, and
    the connecting part drives the adjusting part to protrude to the exterior of the electronic device and the adjusting part flips relative to the connecting part to cover the opening of the sound output channel when the electronic device outputs audio in the handset mode.

2. The audio output mode adjustment structure according to claim 1, wherein:
    a moving channel communicating the interior and the exterior of the electronic device is opened at the top of the electronic device and the moving channel is parallel to the sound output channel, and
    the connecting part drives the adjusting part to protrude to the exterior of the electronic device through the moving channel.

3. The audio output mode adjustment structure according to claim 1, wherein:
    the adjustment unit further includes a rotation conditioning part and the adjusting part that is connected with the connecting part through the rotation conditioning part, and
    the rotation conditioning part is configured to apply a flipping force to drive the adjusting part to flip a preset angle relative to the connecting part.

4. The audio output mode adjustment structure according to claim 3, wherein the rotation conditioning part includes a torsion spring or an elastic piece.

5. The audio output mode adjustment structure according to claim 1, wherein the audio output mode adjustment structure further including a drive assembly that is connected with the connecting part, and the drive assembly drives the connecting part to move relative to the sound output channel so as to drive the adjusting part to cover the sound output channel or not cover the sound output channel.

6. The audio output mode adjustment structure according to claim 5, wherein:
    the drive assembly includes a torque output unit and a motion transmitting unit connected to the torque output unit, the motion transmitting unit and the connecting part is fixedly connected, and
    the torque output unit outputs torque to drive the motion transmitting unit to take a straight-line motion.

7. The audio output mode adjustment structure according to claim 6, further comprising a drive controller that is configured to control the torque output unit to output torque and is electrically connected with a control unit of the electronic device.

8. The audio output mode adjustment structure according to claim 6, wherein the torque output unit includes a motor and a screw bar connected to an output shaft of the motor, and the motion transmitting unit is in a threaded connection with the screw.

9. The audio output mode adjustment structure according to claim 8, wherein the drive assembly further includes a mounting rack having a first mounting part and a second mounting part parallel to each other, and the screw bar is arranged between the first mounting part and the second mounting part, the output shaft of the motor passes through the first mounting part and is fixedly connected with the screw.

10. The audio output mode adjustment structure according to claim 9, wherein the drive assembly further includes a limiting part that is parallel to the screw, with two ends of the limiting part being fixedly connected with the first mounting part and the second mounting part respectively, and the limiting part extending through the motion transmitting unit.

11. The audio output mode adjustment structure according to claim 9, wherein the mounting rack further comprises a fixing part that is fixedly connected with the first mounting part and connected with a shell structure of the electronic device.

12. An audio output mode adjustment method that is applied to an electronic device having an audio output mode adjustment structure, the audio output mode adjustment structure being applied to the electronic device with a handset mode and having a sound output channel communicating an interior of the electronic device and an exterior of the electronic device, and an opening of the sound output channel that is located at a top of the electronic device;

the audio output mode adjustment structure further includes an adjustment unit that is configured to move relative to the opening of the sound output channel, wherein when the electronic device outputs audio in:

a loud-speaking mode, the adjustment unit does not cover the sound output channel and sound waves propagate in a straight line through the opening of the sound output channel, and the handset mode, the adjustment unit covers the opening of the sound output channel so that the sound waves propagate toward a display screen side of the electronic device through the opening of the sound output channel;

the adjusting unit further comprises an adjusting part and a connecting part connected with each other, and under an action of an external force, the connecting part drives the adjusting part to move relative to the opening of the sound output channel;

wherein, when the electronic device outputs audio in:

the loud-speaking mode, the adjusting part does not cover the opening of the sound output channel;

the handset mode, the adjusting part covers the opening of the sound output channel;

wherein: the adjusting part is rotationally connected with the connecting part, and the adjusting part and the connecting part is located at the interior of the electronic device and does not cover the opening of the sound output channel when the electronic device outputs audio in the loud-speaking mode, and the connecting part drives the adjusting part to protrude to the exterior of the electronic device and the adjusting part flips relative to the connecting part to cover the opening of the sound output channel when the electronic device outputs audio in the handset mode;

the audio output mode adjustment method comprising:
receiving audio output mode adjustment information;
determining a target audio output mode based on the audio output mode adjustment information; and
adjusting a position of the adjustment unit of the audio output mode adjustment structure relative to the opening of the sound output channel based on the target audio output mode.

13. An audio output mode adjustment apparatus that is applied to the electronic device having the audio output mode adjustment structure according to claim 1, the audio output mode adjustment apparatus comprising:

a receiving module that is configured to receive audio output mode adjustment information;

a determining module that is configured to determine a target audio output mode according to the audio output mode adjustment information; and an adjusting module that is configured to adjust a position of an adjustment unit of the audio output mode adjustment structure relative to an opening of a sound output channel based on the target audio output mode.

14. An electronic device having an audio output mode adjustment structure that is applied to an electronic device with a handset mode, the audio output mode adjustment structure includes a sound output channel communicating an interior of the electronic device and an exterior of the electronic device, and an opening of the sound output channel that is located at the top of the electronic device;

the audio output mode adjustment structure further includes an adjustment unit that is configured to move relative to the opening of the sound output channel, wherein when the electronic device outputs audio in:

a loud-speaking mode, the adjustment unit does not cover the sound output channel and sound waves propagate in a straight line through the opening of the sound output channel, and the handset mode, the adjustment unit covers the opening of the sound output channel so that the sound waves propagate toward a display screen side of the electronic device through the opening of the sound output channel;

the adjusting unit further comprises an adjusting part and a connecting part connected with each other, and under an action of an external force, the connecting part drives the adjusting part to move relative to the opening of the sound output channel;

wherein, when the electronic device outputs audio in:

the loud-speaking mode, the adjusting part does not cover the opening of the sound output channel;

the handset mode, the adjusting part covers the opening of the sound output channel;

wherein: the adjusting part is rotationally connected with the connecting part, and the adjusting part and the connecting part is located at the interior of the electronic device and does not cover the opening of the sound output channel when the electronic device outputs audio in the loud-speaking mode, and the connecting part drives the adjusting part to protrude to the exterior of the electronic device and the adjusting part flips relative to the connecting part to cover the opening of the sound output channel when the electronic device outputs audio in the handset mode;

the electronic device comprising:
one or more processors; and
a non-transitory storage that is coupled to the one or more processors; and
a plurality of programs stored in the non-transitory storage that, when executed by the one or more processors, cause the electronic device to:
receive audio output mode adjustment information;
determine a target audio output mode based on the audio output mode adjustment information; and
adjust a position of an adjustment unit of the audio output mode adjustment structure relative to an opening of a sound output channel based on the target audio output mode.

* * * * *